(12) United States Patent
Zhang et al.

(10) Patent No.: US 10,099,932 B2
(45) Date of Patent: Oct. 16, 2018

(54) RAPID SYNTHESIS METHOD OF SMALL-CRYSTAL-GRAIN ZSM-5 MOLECULAR SIEVE

(71) Applicants: RESEARCH INSTITUTE OF SHAANXI YANCHANG PETROLEUM (GROUP) CO., LTD, Xi'an, Shaanxi (CN); DALIAN UNIVERSITY OF TECHNOLOGY, Dalian, Liaoning Province (CN)

(72) Inventors: Wei Zhang, Xi'an (CN); Xiongfu Zhang, Xi'an (CN); Dapeng Li, Xi'an (CN); Ruimin Gao, Xi'an (CN); Yongbin Lu, Xi'an (CN); Shuqin Zhang, Xi'an (CN); Mingfeng Wang, Xi'an (CN); Pengju Huo, Xi'an (CN); Si Li, Xi'an (CN); Chengda Wang, Xi'an (CN); Weiwu Xu, Xi'an (CN); Yuan Zhang, Xi'an (CN); Zhiling Liu, Xi'an (CN); Ting Pei, Xi'an (CN); Hua Zhang, Xi'an (CN); Gang Chen, Xi'an (CN); Haiou Liu, Xi'an (CN)

(73) Assignees: RESEARCH INSTITUTE OF SHAANXI YANCHANG PETROLEUM (GROUP) CO., LTD., Shaanxi (CN); DALIAN UNIVERSITY OF TECHNOLOGY, Dalian (CN)

( * ) Notice: Subject to any disclaimer, the term of this patent is extended or adjusted under 35 U.S.C. 154(b) by 72 days.

(21) Appl. No.: 15/505,490

(22) PCT Filed: Jul. 14, 2015

(86) PCT No.: PCT/CN2015/083940
§ 371 (c)(1),
(2) Date: Feb. 21, 2017

(87) PCT Pub. No.: WO2016/041404
PCT Pub. Date: Mar. 24, 2016

(65) Prior Publication Data
US 2017/0233259 A1  Aug. 17, 2017

(30) Foreign Application Priority Data
Aug. 21, 2014 (CN) .......................... 2014 1 0414006

(51) Int. Cl.
*C01B 39/40* (2006.01)
*B01J 29/40* (2006.01)

(52) U.S. Cl.
CPC ............. *C01B 39/40* (2013.01); *B01J 29/40* (2013.01); *C01P 2002/60* (2013.01); *C01P 2002/72* (2013.01); *C01P 2004/03* (2013.01); *C01P 2004/60* (2013.01); *C01P 2004/62* (2013.01)

(58) Field of Classification Search
CPC ..... C01B 39/38; C01B 39/40; C01P 2002/60; C01P 2002/72; C01P 2004/03; C01P 2004/60; C01P 2004/62; B01J 29/40
See application file for complete search history.

(56) References Cited

U.S. PATENT DOCUMENTS

2012/0027673 A1* 2/2012 Larsen ................... B82Y 30/00
423/704

FOREIGN PATENT DOCUMENTS

| CN | 1240193 A | 1/2000 |
|----|-----------|--------|
| CN | 1958453 A | 5/2007 |
| CN | 101279746 A | 10/2008 |
| CN | 101182004 B | 5/2010 |
| CN | 102826568 A | 12/2012 |
| CN | 104150507 A | 11/2014 |
| CN | 104192859 A | 12/2014 |

OTHER PUBLICATIONS

Oct. 19, 2015 Search Report issued in International Patent Application No. PCT/CN2015/083940.
Oct. 19, 2015 Written Opinion issued in International Patent Application No. PCT/CN2015/083940.
Sep. 6, 2015 Office Action issued in Chinese Patent Application No. 201410414006.3.
Apr. 19, 2016 Office Action issued in Chinese Patent Application No. 201410414006.3.
Oct. 19, 2016 Office Action issued in Chinese Patent Application No. 201410414006.3.

* cited by examiner

*Primary Examiner* — David M Brunsman
(74) *Attorney, Agent, or Firm* — Oliff PLC

(57) ABSTRACT

A rapid synthesis method of a small-crystal-grain ZSM-5 molecular sieve, the method comprising: preparing a mixed silicon-aluminum glue solution, placing the solution in a crystallization kettle for low-temperature nucleation, enabling high-temperature crystallization growth of the solution, and obtaining a crystallization product, namely, a small-crystal-grain ZSM-5 molecular sieve, the nucleation temperature being 60-120° C., nucleation time being 1-3 hours, a crystallization growth temperature being 150-170° C., and crystallization growth time being 1-3 hours. The method is easy to operate, and has a short operation time, thus being able to complete within 6 hours; in addition, the product has uniform grain sizes, is in a mono-dispersed state, and has a high crystallization degree to a submicron degree.

10 Claims, 4 Drawing Sheets

RAPID SYNTHESIS METHOD OF SMALL-CRYSTAL-GRAIN ZSM-5 MOLECULAR SIEVE

TECHNICAL FIELD

The present invention relates to a method for preparing a ZSM-5 molecular sieve.

BACKGROUND ART

Due to its excellent performance, zeolite molecular sieves have a wide range of applications in refining, petrochemical, organic synthesis and many other fields. Among zeolite molecular sieves, a ZSM-5 molecular sieve has good catalytic activity, stability and shape selectivity because of its unique pore structure. In addition, when compared with a large-crystal-grain ZSM-5 molecular sieve, a small-crystal-grain molecular sieve has an even larger external surface area, which allows more active center to be exposed on the external surface. Moreover, a small-crystal-grain molecular sieve has short intra-crystalline porous channels. As a result, reactant molecules and product molecules have a lower diffusion resistance and high diffusion rate in the porous channels. A small-crystal-grain molecular sieve has short intra-crystalline porous channels and high diffusion rate in the channels. Accordingly, the generated reaction product can quickly diffuse out from the channels, which can prevent it from having any side reaction, and accordingly it helps to improve the selectivity of the product. On the other hand, a small-crystal-grain molecular sieve can help to reduce carbon deposition in channels and reduce catalyst coking and deactivation. The small-crystal-grain ZSM-5 molecular sieve has shown relatively good catalytic performance in most catalytic reactions, in which it has greatly improved the activity and selectivity of catalysts. However, on the other hand, the synthesis of the ZSM-5 molecular sieve typically has problems including complex synthetic process and long synthetic period. As a result, the rapid synthesis of the small-crystal-grain ZSM-5 molecular sieve has important practical significance.

To date, there are many reports on the synthesis of the small-crystal-grain ZSM-5 molecular sieve. The primary approaches employed in the preparation are shown in the following aspects: 1) Add nanoscale zeolite seeds into the synthetic system to synthesize a directing agent, so as to induce the formation of the small-crystal-grain ZSM-5 molecular sieve. In CN1958453A, a silicon source is dissolved in an acidic solution, and then add a templating agent; next slowly add the aqueous solution of aluminum source in the solution of silicon source, and at the same time, add the molecular sieve seed, and then carry out a hydrothermal crystallization process at a temperature of 100 to 200° C. for 10 to 60 h, so as to obtain a ZSM-5 molecular sieve having a particle size within the range of from 100 to 400 nm. (2) Introduce an inorganic salt or surfactant, etc. into the synthetic system to regulate the synthesis of the small-crystal-grain ZSM-5 molecular sieve. CN101182004B discloses a process for preparing a synthetic nanoscale molecular sieve, in which a hydrocarbon component and a surfactant are added into a precursor solution, so as to form an oil-coated melt super-compatibilizer system to effectively control the growth of the molecular sieve. (3) Regulate and control the synthetic condition, in particular using a low temperature to facilitate nucleus formation, so as to form a small-crystal-grain ZSM-5 molecular sieve. CN101279746 proposes to employ a variable temperature crystallization method to form the ZSM-5 molecular sieve, in which a short chain amine is used as the template, and the reaction mixture is first aged at a temperature of 115 to 125° C. for 1 to 4 h, and then transferred to a temperature of 230 to 250° C. for crystallization 4 to 8 h. The sizes of the crystal grains of the ZSM-5 molecular sieves prepared through the process mentioned above are various, from dozens of nanometers to hundreds of nanometers. However, the synthetic process and preparation processes are quite complex and the time period of the process is very long, at least longer than 10 h. In addition, the products can be formed only when adding the crystal seeds and other materials. The entire preparation process is time- and energy consuming, and thus wastes lots of energy, time and at the same time, contaminates the environment.

In our prior patent entitled "One-step preparation method for empty shell-type small-grain ZSM-5 molecular sieve" (Patent no.: 201410361785.5), the empty shell-type small-grain ZSM-5 molecular sieve is obtained by way of regulating the synthesis solution and crystallization growth process. However, this method needs a long time period for synthesis, which is typically 24 h (at least longer than 6 h). In addition, the preparation process is relatively time- and energy consuming.

TECHNICAL PROBLEM

The present invention aims to provide a rapid synthesis method which features a very short crystallization time and a product that is a submicron small-crystal-grain ZSM-5 molecular sieve with high crystallinity.

SOLUTION FOR THE PROBLEM

Technical Solution

The present invention provides a rapid synthesis method of the small-crystal-grain ZSM-5 molecular sieve. First, a mixed colloidal solution of silicon and aluminum is prepared, and then the mixed colloidal solution is loaded into a crystallization kettle for nucleation at a low temperature and subsequently subjected to a crystallization growth at a high temperature; the obtained crystallization product is the small-crystal-grain ZSM-5 molecular sieve, wherein the nucleation temperature is within a range of from 60 to 120° C., and the nucleation time is from 1 to 3 h; the crystallization growth temperature is within a range of from 150 to 170° C., and the crystallization growth time is from 1 to 3 h.

Preferably, the nucleation temperature is within a range of from 100 to 120° C., and the nucleation time is 1 h; the crystallization growth temperature is within a range of from 160 to 170° C., and the crystallization growth time is 1 h.

More preferably, the particle size of the small crystal grain is from 270 to 450 nm.

Or more preferably, the mixed colloidal solution of silicon and aluminum is prepared as follows: first mixing an organic templating agent, an aluminum source and water, then adding a silicon source, mixing well to allow a hydrolysis, so as to form a uniform mixed colloidal solution of silicon and aluminum.

Or more preferably, a molar ratio of the $SiO_2$ in the silicon source to the "$Al_2O_3$ in the aluminum source is from 40 to 100.

Or more preferably, the organic templating agent is tetrapropylammonium hydroxide.

Or more preferably, the silicon source is ethyl orthosilicate.

Or more preferably, the aluminum source is sodium aluminate.

Furthermore, preferably, the crystallization product further undergoes washing, drying and roasting.

Most preferably, the drying temperature is 120° C., the roasting temperature is 540° C., and roasting time is 6 h.

For the purpose of addressing the deficiencies in the current preparation processes for the small-crystal-grain ZSM-5 molecular sieve, a simple method for rapid preparation of the small-crystal-grain ZSM-5 molecular sieve is proposed in the present application. The preparation process has the advantages of simple operation and short synthesis period. In addition, the synthesis process does not require addition of any other substance. The submicron small-crystal-grain ZSM-5 molecular sieve obtained from the rapid synthesis process has a uniform particle size distribution and high crystallinity.

Advantageous Effects of the Present Invention

The entire operation process of the present invention is very simple, and the synthesis can be finished within 6 h, which is a very short time period. In addition, the obtained small-crystal-grain ZSM-5 molecular sieve has desirable particle size distribution at the submicron scale, a single dispersion state, a high crystallinity.

In addition, in some preferred embodiments of the present invention, in addition to the raw materials in the formulation, no other substance is needed. As a result, the synthesis of the present invention is simple and can save materials. It allows the obtaining of small-crystal-grain ZSM-5 zeolites with different particle sizes by way of simply adjusting certain synthesis conditions.

BRIEF DESCRIPTION OF THE DRAWINGS

Description of Drawings

Figure 1:
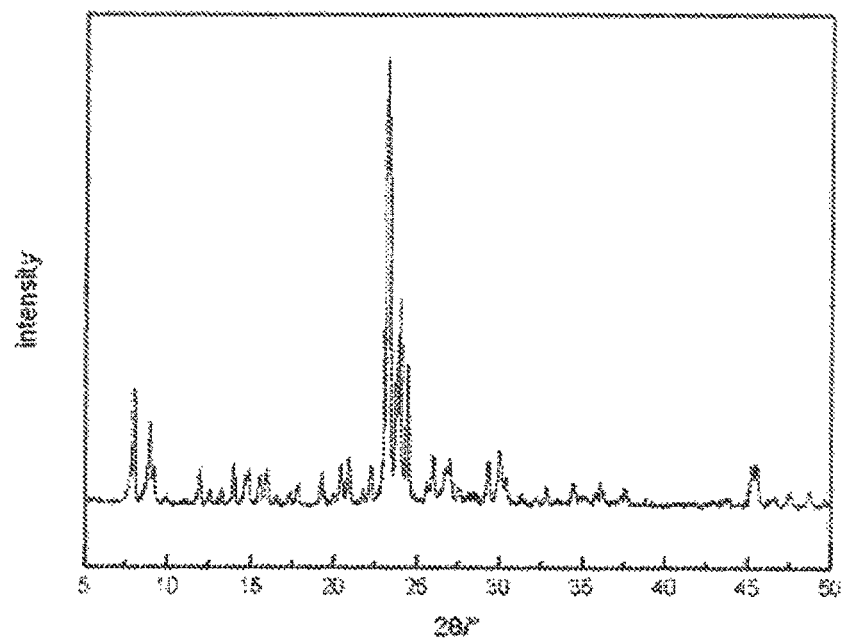

FIG. 1 is the X-ray diffraction pattern of the sample synthesized in Example 1.

Figure 2:
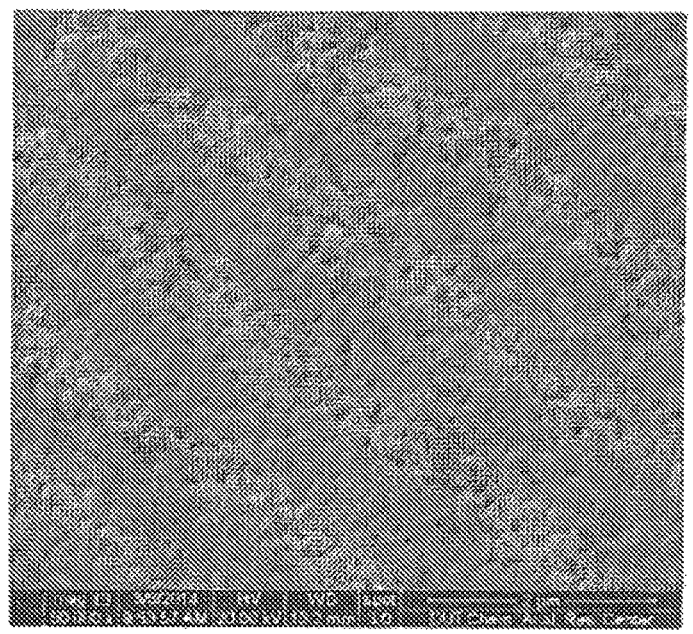

FIG. 2 is a scanning electron micrograph of the sample synthesized in Example 1.

Figure 3:
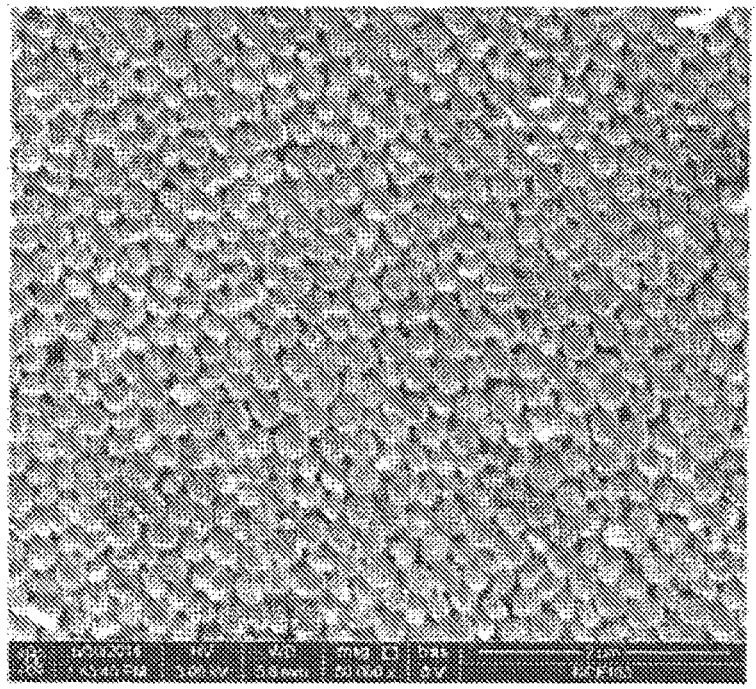

FIG. 3 is a scanning electron micrograph of the sample synthesized in Example 2.

Figure 4:
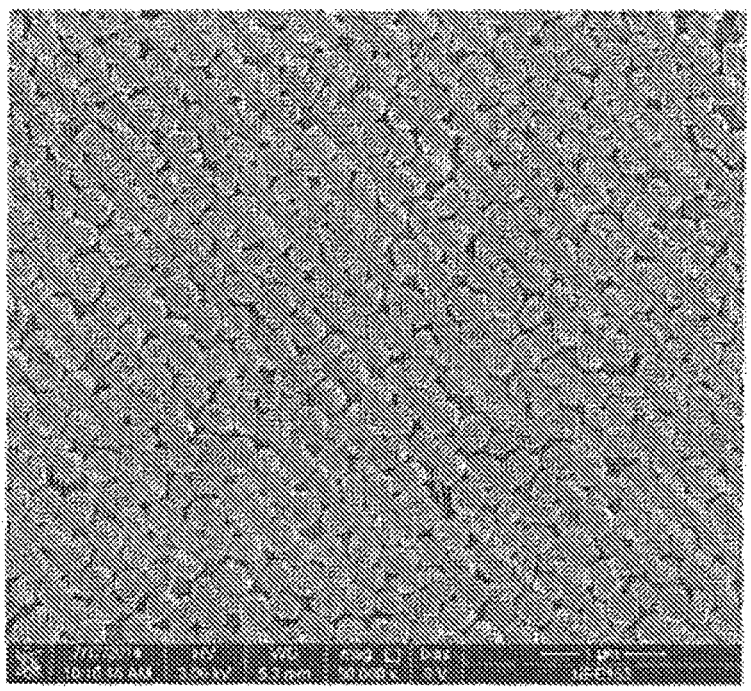

FIG. 4 is a scanning electron micrograph of the sample synthesized in Example 4.

Figure 5:
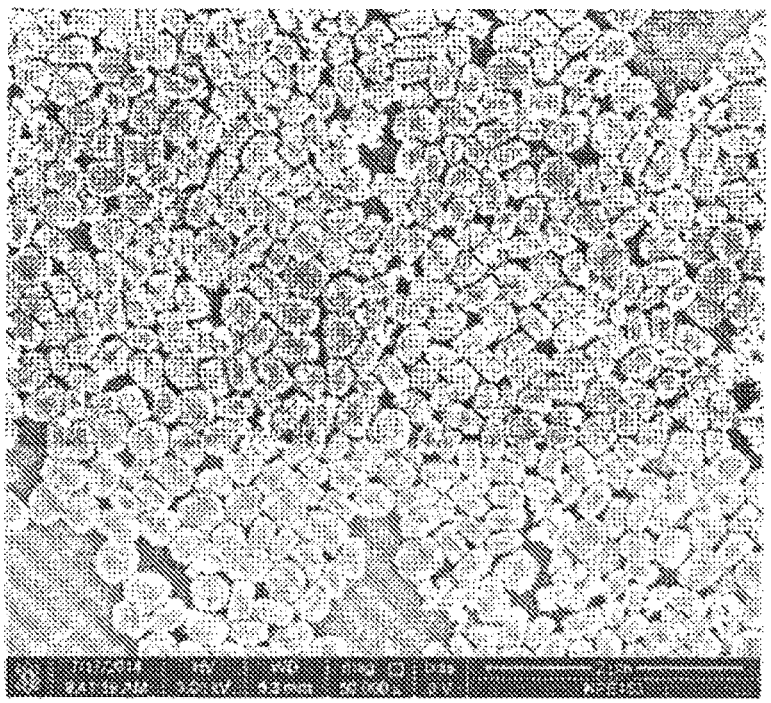

FIG. 5 is a scanning electron micrograph of the sample synthesized in Example 7.

Figure 6:
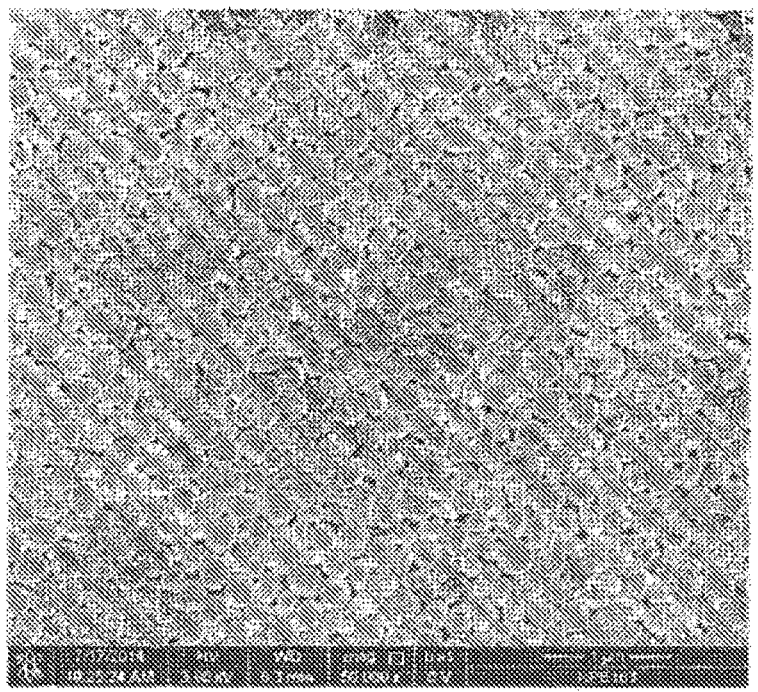

FIG. 6 is a scanning electron micrograph of the sample synthesized in Example 8.

Figure 7:
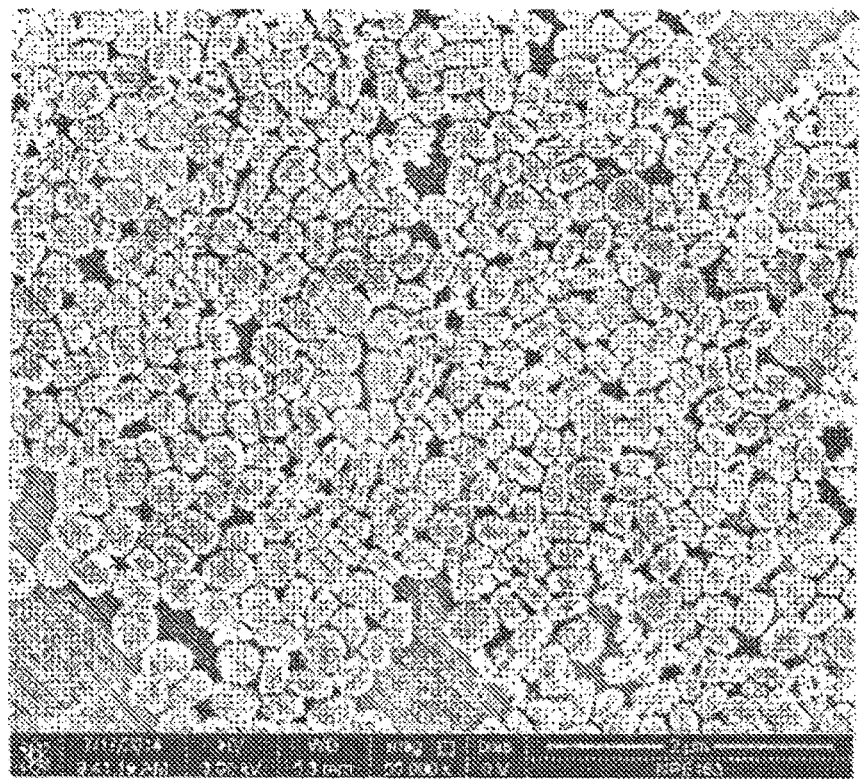

FIG. 7 is a scanning electron micrograph of the sample synthesized in Example 11.

INVENTION EXEMPLARY EMBODIMENTS

Embodiments of the Present Invention

EXAMPLE 1

Mix 17.6 g of the templating agent tetrapropylammonium hydroxide, 30 g of water, 0.2 g of sodium aluminate, and then add 16 mL ethyl orthosilicate, mix for 2 h to obtain a uniform colloidal solution, which is then loaded into a stainless steel crystallization kettle, carry out a nucleation process at a temperature of 100° C. for 3 h, and then carry out a crystallization growth at a temperature of 170° C. for 3 h; the obtained product is then filtered and washed, and subsequently dried at a temperature of 120° C., and then roasted at a temperature of 540° C. for 6 h. FIG. 1 shows an X-ray diffraction (XRD) pattern of the small-crystal-grain sample synthesized in this example. As shown in the figure, the sample has shown the characteristic peaks of a typical MFI-type zeolite. In addition, no impurity peaks have been found, which indicates that the obtained product is a pure ZSM-5 molecular sieve. FIG. 2 is a scanning electron micrograph (SEM) of the sample synthesized in this example. As shown in the figure, the obtained small-crystal-grain ZSM-5 molecular sieve has a particle size of 320 nanometers.

EXAMPLE 2

Repeat the operating procedures provided in Example 1 with the exception that in this example, the nucleation process is carried out at a temperature of 80° C. for 3 h, and the crystallization growth process is carried out at a temperature of 170° C. for 3 h. The synthesized small-crystal-grain LSM-5 molecular sieve has a particle size of 270 nanometers.

EXAMPLE 3

Repeat the operating procedures provided in Example 1, with the exception that in this example, the nucleation process is carried out at a temperature of 120° C. for 3 h, and the crystallization growth process is carried out at a temperature of 170° C. for 3 h. The synthesized small-crystal-grain ZSM-5 molecular sieve has a particle size of 390 nanometers.

EXAMPLE 4

Repeat the operating procedures provided in Example 1, with the exception that in this example, the nucleation process is carried out at a temperature of 100° C. for 3 h, and the crystallization growth process is carried out at a temperature of 150° C. for 3 h. The synthesized small-crystal-grain ZSM-5 molecular sieve has a particle size of 290 nanometers.

EXAMPLE 5

Repeat the operating procedures provided in Example 1, with the exception that in this example, the nucleation process is carried out at a temperature of 100° C. for 1 h, and the crystallization growth process is carried out at a temperature of 170° C. for 3 h. The synthesized small-crystal-grain ZSM-5 molecular sieve has a particle size of 390 nanometers.

EXAMPLE 6

Repeat the operating procedures provided in Example 1, with the exception that in this example, the nucleation process is carried out at a temperature of 100° C. for 3 h, and the crystallization growth process is carried out at a temperature of 170° C. for 1 h. The synthesized small-crystal-grain ZSM-5 molecular sieve has a particle size of 280 nanometers.

EXAMPLE 7

Repeat the operating procedures provided in Example 1, with the exception that in this example, the nucleation process is carried out at a temperature of 100° C. for 1 h, and the crystallization growth process is carried out at a temperature of 170° C. for 1 h. The synthesized small-crystal-grain ZSM-5 molecular sieve has a particle size of 330 nanometers.

EXAMPLE 8

Repeat the operating procedures provided in Example 1, with the exception that in this example, the nucleation process is carried out at a temperature of 120° C. for 1 h, and the crystallization growth process is carried out at a temperature of 160° C. for 1 h. The synthesized small-crystal-grain ZSM-5 molecular sieve has a particle size of 300 nanometers.

EXAMPLE 9

Repeat the operating procedures provided in Example 1, with the exception that in this example, the nucleation process is carried out at a temperature of 110° C. for 1 h, and the crystallization growth process is carried out at a temperature of 168° C. for 1 h. The synthesized small-crystal-grain ZSM-5 molecular sieve has a particle size of 350 nanometers.

EXAMPLE 10

Repeat the operating procedures provided in Example 1, with the exception that in this example, the amount of the templating agent added to the system is 23.5 mL, and the synthesized small-crystal-grain ZSM-5 molecular sieve has a particle size of 270 nanometers.

EXAMPLE 11

Repeat the operating procedures provided in Example 1, with the exception that in this example, the amount of the templating agent added to the system is 11.7 mL, and the synthesized small-crystal-grain ZSM-5 molecular sieve has a particle size of 450 nanometers.

EXAMPLE 10

Repeat the operating procedures provided in Example 1, with the exception that in this example, the amount of sodium aluminate added to the system is 0.3 g, and the synthesized small-crystal-grain ZSM-5 molecular sieve has a particle size of 300 nanometers.

EXAMPLE 12

Repeat the operating procedures provided in Example 1, with the exception that in this example, the amount of sodium aluminate added to the system is 0.12 g, and the synthesized small-crystal-grain ZSM-5 molecular sieve has a particle size of 270 nanometers.

EXAMPLE 13

Repeat the operating procedures provided in Example 1, with the exception that in this example, the nucleation process is carried out at a temperature of 60° C. for 3 h, and the crystallization growth process is carried out at a temperature of 170° C. for 3 h. The synthesized small-crystal-grain ZSM-5 molecular sieve has a particle size of 400 nanometers.

The invention claimed is:

1. A rapid method of synthesizing a small-crystal-grain ZSM-5 molecular sieve, wherein a mixed colloidal solution of silicon and aluminum is prepared, and then the mixed colloidal solution is loaded into a crystallization kettle for nucleation at a low temperature and subsequently subjected to a crystallization growth at a high temperature, the obtained crystallization product is the small-crystal-grain ZSM-5 molecular sieve, wherein the nucleation temperature is within a range of from 60 to 120° C., and the nucleation time is from 1 to 3 h; the crystallization growth temperature is within a range of from 150 to 170° C., and the crystallization growth time is from 1 to 3 h.

2. The rapid method of synthesizing a small-crystal-grain ZSM-5 molecular sieve according to claim 1, wherein the nucleation temperature is within a range of from 100 to 120° C., and the nucleation time is 1 h; the crystallization growth temperature is within a range of from 160 to 170° C., and the crystallization growth time is 1 h.

3. The rapid method of synthesizing a small-crystal-grain ZSM-5 molecular sieve according claim 1, wherein the drying temperature is 120° C., the roasting temperature is 540° C., and roasting time is 6 h.

4. The rapid method of synthesizing a small-crystal-grain ZSM-5 molecular sieve according to claim 1, wherein the particle size of the small crystal grain is from 270 to 450 nm.

5. The rapid method of synthesizing a small-crystal-grain ZSM-5 molecular sieve according to claim 4, wherein a molar ratio of the $SiO_2$ in the silicon source to the "$Al_2O_3$ in the aluminum source is from 40 to 100.

6. The rapid method of synthesizing a small-crystal-grain ZSM-5 molecular sieve according to claim 4, wherein the organic templating agent is tetrapropylammonium hydroxide.

7. The rapid method of synthesizing a small-crystal-grain ZSM-5 molecular sieve according to claim 4, wherein the silicon source is ethyl orthosilicate.

8. The rapid method of synthesizing a small-crystal-grain ZSM-5 molecular sieve according to claim 4, wherein the aluminum source is sodium aluminate.

9. The rapid method of synthesizing a small-crystal-grain ZSM-5 molecular sieve according to claim 1, wherein the mixed colloidal solution of silicon and aluminum is prepared as follows: first mixing an organic templating agent, an aluminum source and water, then adding a silicon source, mixing well to allow a hydrolysis, so as to form a uniform mixed colloidal solution of silicon and aluminum.

10. The rapid method of synthesizing a small-crystal-grain ZSM-5 molecular sieve according to claim 4, wherein the crystallization product further undergoes washing, drying and roasting.

* * * * *